US012570789B2

(12) United States Patent
Fujii et al.

(10) Patent No.: US 12,570,789 B2
(45) Date of Patent: Mar. 10, 2026

(54) CURABLE COMPOUND, CURABLE COMPOSITION, AND METHOD FOR PRODUCING CURABLE COMPOSITION

(71) Applicant: Nitto Shinko Corporation, Sakai (JP)

(72) Inventors: Hirofumi Fujii, Sakai (JP); Daisuke Hirayama, Sakai (JP); Ryuji Kawamura, Sakai (JP); Satoshi Okuda, Sakai (JP)

(73) Assignee: NITTO SHINKO CORPORATION, Sakai (JP)

( * ) Notice: Subject to any disclaimer, the term of this patent is extended or adjusted under 35 U.S.C. 154(b) by 484 days.

(21) Appl. No.: 18/016,482

(22) PCT Filed: Jul. 19, 2021

(86) PCT No.: PCT/JP2021/026927

§ 371 (c)(1),
(2) Date: Jan. 17, 2023

(87) PCT Pub. No.: WO2022/019256

PCT Pub. Date: Jan. 27, 2022

(65) Prior Publication Data

US 2023/0312811 A1 Oct. 5, 2023

(30) Foreign Application Priority Data

Jul. 21, 2020 (JP) ................................ 2020-124356
Dec. 8, 2020 (JP) ................................ 2020-203305

(51) Int. Cl.

*C08G 18/67* (2006.01)
*C08G 18/62* (2006.01)
*C08G 18/73* (2006.01)
*C08G 18/79* (2006.01)

(52) U.S. Cl.

CPC ......... *C08G 18/73* (2013.01); *C08G 18/6204* (2013.01); *C08G 18/67* (2013.01); *C08G 18/6715* (2013.01); *C08G 18/791* (2013.01)

(58) Field of Classification Search

CPC ...... C08G 18/73; C08G 18/67; C08G 18/791; C08G 18/6715; C08G 18/6204

See application file for complete search history.

(56) References Cited

U.S. PATENT DOCUMENTS

| | | | |
|---|---|---|---|
| 11,773,202 | B2 | 10/2023 | Kawamura et al. |
| 2013/0302070 | A1 | 11/2013 | Dosaku et al. |
| 2017/0051096 | A1 | 2/2017 | Lu et al. |
| 2022/0073672 | A1 | 3/2022 | Kawamura et al. |

FOREIGN PATENT DOCUMENTS

| | | | |
|---|---|---|---|
| CN | 103717632 | A | 4/2014 |
| CN | 107075069 | A | 8/2017 |
| CN | 107406563 | A | 11/2017 |
| CN | 108026246 | A | 5/2018 |
| JP | 2003-266614 | A | 9/2003 |
| JP | 2010-138361 | A | 6/2010 |
| JP | 2012-159736 | A | 8/2012 |
| JP | 2015-71682 | A | 4/2015 |
| JP | 2016-50251 | A | 4/2016 |
| JP | 2017-521505 | A | 8/2017 |
| JP | 2017-179171 | A | 10/2017 |
| JP | 2018-024761 | A | 2/2018 |
| JP | 2020-100814 | A | 7/2020 |
| KR | 20100069559 | A | 6/2010 |
| KR | 20180054560 | A | 5/2018 |
| WO | 2017/047612 | A1 | 3/2017 |
| WO | 2017/170932 | A1 | 10/2017 |
| WO | 2020/145327 | A1 | 7/2020 |

OTHER PUBLICATIONS

NISSO-PB_Nisso 2025_pp. 1-7.*

Extended Supplementary European Search Report dated Jul. 8, 2024, issued in counterpart Application No. 21846926.0 has received. (6 pages).

Office Action dated Jul. 8, 2024, issued in counterpart CN application No. 202180048444.0, with Partial English translation. (31 pages).

Yutian Liu, Polyurethane Structural Adhesive, World Rubber Industry, 2002, pp. 26-29; Cited in CN Office Action dated Jul. 8, 2024. (4 Pages).

Jianding Chen, et al., Synthesis of Polyurethane Acrylate Oligomers Based on Polybutadiene Polyol, Jounal of Polymer Science Part A-Polymer Chemistry, 1996, vol. 34, 2889-2907; Cited in CN Office Action dated Jul. 8, 2024. (19 Pages).

Office Action dated Nov. 15, 2024, issued in counterpart TW application No. 110126628, with English translation. (10 pages).

International Search Report dated Oct. 12, 2021, issued in counterpart Application No. PCT/JP2021/026927. (2 pages).

Office Action dated Mar. 10, 2025, issued in counterpart KR Application No. 2023-7004405, with English translation. (11 pages).

* cited by examiner

*Primary Examiner* — Michael L Leonard

(74) *Attorney, Agent, or Firm* — WHDA, LLP

(57) ABSTRACT

Provided is a curable composition including a urethanization reaction product of: a branched polyolefin diol having a carbon-carbon double bond in a side chain; at least one selected from an isocyanurate product, an adduct product, and a biuret product, of an aliphatic diisocyanate having 6 or more and 10 or less total carbon atoms; and a hydroxy saturated $C_1$ to $C_4$ alkyl (meth) acrylate. Also provided are a method for producing the curable composition, and a specific curable compound included in the curable composition.

6 Claims, 1 Drawing Sheet

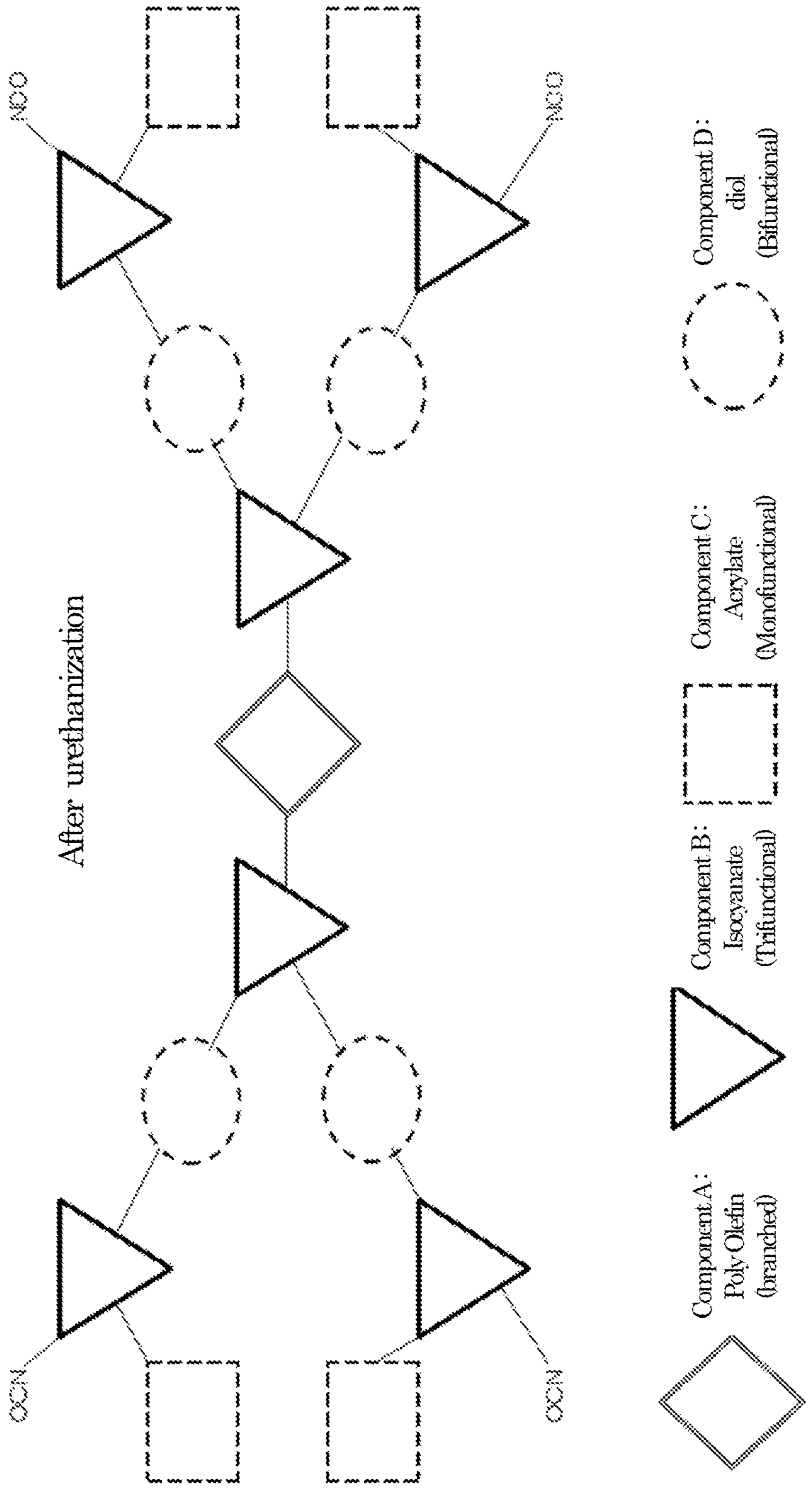
After urethanization
NCO
NCO
OCN
OCN
Component A: Poly Olefin (branched)
Component B: Isocyanate (Trifunctional)
Component C: Acrylate (Monofunctional)
Component D: diol (Bifunctional)

CURABLE COMPOUND, CURABLE COMPOSITION, AND METHOD FOR PRODUCING CURABLE COMPOSITION

CROSS-REFERENCE TO RELATED APPLICATION

This application claims priority to Japanese Application Nos. 2020-124356 and 2020-203305, the disclosure of which are incorporated herein by reference in their entirety.

FIELD

The present invention relates to a curable compound, a curable composition including the curable compound, and a method for producing the curable composition.

BACKGROUND

Conventionally, a curable composition that is cured by being exposed to light, water (moisture), or the like. Known as the curable composition of this type is a curable composition that is cured by, for example, being exposed to light, and including urethane acrylate (curable compound) having a number average molecular weight of 1,000 to 20,000 synthesized from hydrogenated polybutadienediol or hydrogenated polyisoprenediol, a monofunctional (meth) acrylate monomer, and an initiator having an absorption band at a wavelength of 380 nm or more (for example, Patent Literature 1). In the curable compound described in Patent Literature 1, the content of the initiator is to 15 parts by mass based on 100 parts by mass of the total amount of the curable compound and the monomer.

The curable composition described in Patent Literature 1 is used for application to coating for electronic circuits, in which the curable composition is coated on, for example, an electronic circuit and irradiated with light so that the curable compound and the monomer are reacted. The curable composition is thus cured. The curable composition described in Patent Literature 1 is cured by light even from an LED light source and can have good moisture proof properties, electrical insulation properties, and the like.

CITATION LIST

Patent Literature

Patent Literature 1: JP 2018-024761 A

SUMMARY

Technical Problem

However, there is a case where the tackiness (weak adhesion) in a surface of a cured product resulting from curing of the curable composition described in Patent Literature 1 is not necessarily suppressed for the reason that, for example, the curable compound included in the curable composition described in Patent Literature 1 does not have unsaturated bonds due to hydrogenation. In this case, it may cause a problem that foreign matters (that may reduce the electrical insulation properties of the cured product, for example) adhere to a surface of the cured product or cause a trace of contact remaining on a surface of the cured product when an object such as a packing material contacts the cured product. Also, there is a problem that the cured product does not have appropriate stretchability even when a surface tackiness is suppressed. Accordingly, there has been a demand for a curable composition that enables to suppress the surface tackiness on a cured product after being cured and enable the cured product to have an appropriate stretchability.

In view of the above problems, demands, and the like, it is an object of the present invention to provide a curable compound and a curable composition capable of obtaining a cured product that makes it possible to suppress the surface tackiness and have an appropriate stretchability.

Also, it is an object to provide a curable composition producing method for producing a curable composition including the curable compound described above.

Solution to Problem

In order to solve the above problem, a curable compound according to the present invention is characterized in that it is represented by a general formula (I) below:

General formula (I)

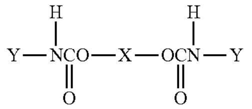

[In the general formula (I), X represents a branched polyolefin structure having a carbon-carbon double bond in a side chain, and two Y's each independently represent any of a general formula (II) or a general formula (III) below. In each of the general formulae (II) and (III), T's each independently represent any of general formulae (a) to (d) below, a plurality of Z's each independently represent any of a molecular structure represented by a general formula (a) below or represent —NCO. In the general formula (III), two L's each independently represent a diol residue.]

General formula (II)

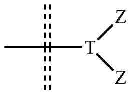

General formula (III)

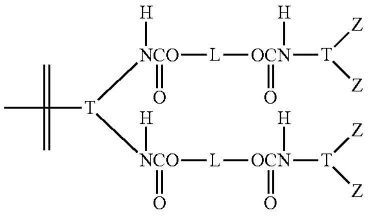

General formula (a)

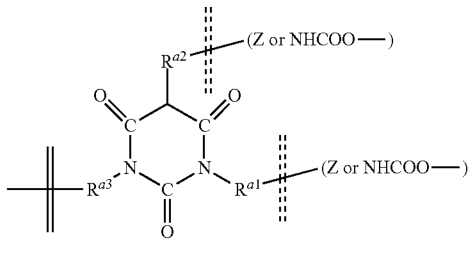

[ In the general formula (a), $R^{a1}$, $R^{a2}$, and $R^{a3}$ each independently represent an organic group.]

General formula (b)

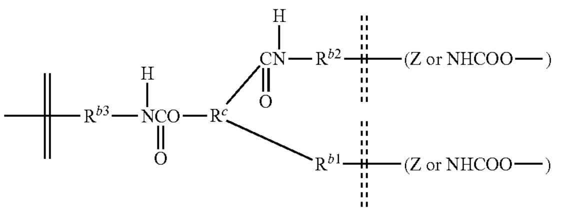

[ In the general formula (b), $R^{b1}$, $R^{b2}$, $R^{b3}$, and $R^{c}$ each independently represent an organic group.]

General formula (c)

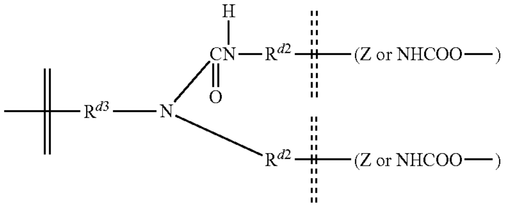

[ In the general formula (c), $R^{d1}$, $R^{d2}$, and $R^{d3}$ each independently represent an organic group.]

General formula (d)

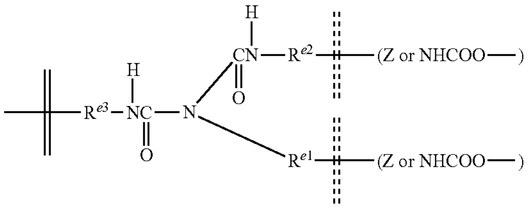

[In the general formula (d), $R^{e1}$, $R^{e2}$, and $R^{e3}$ each independently represent an organic group.]

General formula (α)

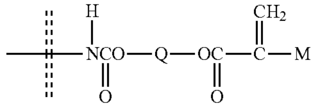

[In the general formula (α), Q represents a saturated hydrocarbon group having 2 or more and 4 or less carbon atoms, and M represents H or $CH_3$.]

The curable composition according to the present invention includes a urethanization reaction product of: a branched polyolefin diol having a carbon-carbon double bond in a side chain; at least one selected from an isocyanurate product, an adduct product, and a biuret product, of an aliphatic diisocyanate having 6 or more and or less total carbon atoms; and a hydroxy saturated $C_1$ to $C_4$ alkyl (meth) acrylate.

A method for producing a curable composition according to the present invention is characterized by producing a curable composition including a urethanization reaction product by a urethanization reaction under a presence of: a branched polyolefin diol having a carbon-carbon double bond in a side chain; at least one selected from an isocyanurate product, an adduct product, and a biuret product, of an aliphatic diisocyanate having 6 or more and 10 or less total carbon atoms; and a hydroxy saturated $C_1$ to $C_4$ alkyl (meth) acrylate.

BRIEF DESCRIPTION OF DRAWINGS

FIG. 1 is a schematic view schematically showing an example of a urethanization reaction product.

DESCRIPTION OF EMBODIMENTS (Curable compound)

Hereinafter, an embodiment of a curable compound according to the present invention will be described.

A curable compound of this embodiment is represented by a general formula (I) below:

General formula (I)

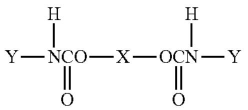

[In the general formula (I), X represents a branched polyolefin structure having a carbon-carbon double bond in a side chain, and two Y's each independently represent any of a general formula (II) or a general formula (III) below. In each of the general formulae (II) and (III), T's each independently represents any of general formulae (a) to (d) below, a plurality of Z's each independently represent any of a molecular structure represented by a general formula (α) below or represent-NCO. In the general formula (III), two L's each independently represent a diol residue.]

General formula (II)

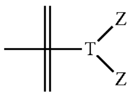

General formula (III)

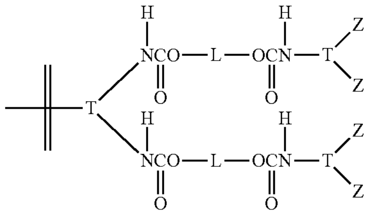

General formula (a)

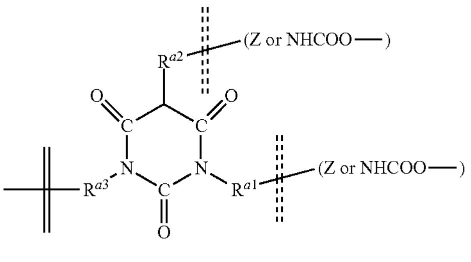

≠ In the general formula (α), $R^{a1}$, $R^{a2}$, and $R^{a3}$ each independently represent an organic group.[ Note that a portion denoted as (Z or NHCOO—) in the general formula (α) is not included in T in the general formulae (II) or (III) (herein described for reference). Hereinafter, the same applies to the general formulae (b) to (d).

General formula (b)

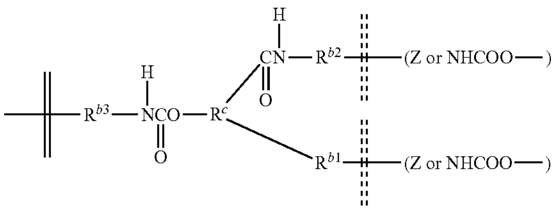

[In the general formula (b), $R^{b1}$, $R^{b2}$, $R^{b3}$, and Re each independently represent an organic group.]

General formula (c)

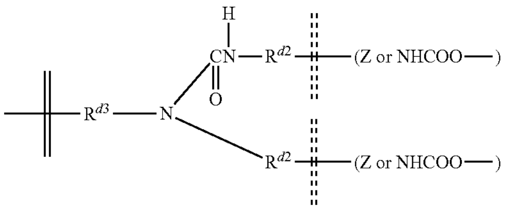

[In the general formula (c), $R^{d1}$, $R^{d2}$, and $R^{d3}$ each independently represent an organic group.]

General formula (d)

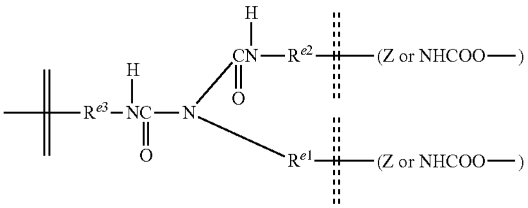

[In the general formula (d), $R^{e1}$, $R^{e2}$, and $R^{e3}$ each independently represent an organic group.]

General formula (α)

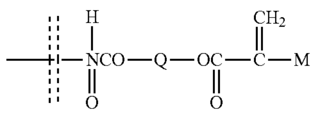

[In the general formula (α), Q represents a saturated hydrocarbon group having 2 or more and 4 or less carbon atoms.]

Note that, when a double wavy line in each of the above general formulae is shown, a double wavy line in a solid line represents a position closer to X in the general formula (I) and a double wavy line in a dashed line represents a position farther from X in the general formula (I).

The curable compound of this embodiment includes at least one of an acryloyl group of (meth) acry late or an isocyanate group (—NCO) in the molecule. Specifically, as shown by Z in the general formulae (II) and (III), the curable compound of this embodiment includes at least one of an (meth) acryloyl group or an isocyanate group (—NCO) involved in a curing reaction in the molecule. Therefore, the curable composition can be cured by being exposed to light such as ultraviolet rays or water (such as moisture) in the air. For example, irradiation of light such as ultraviolet rays causes the (meth) acryloyl group to cause a polymerization reaction. The polymerization of the compounds enables a polymerization (curing reaction) to proceed. Further, for example, a reaction between-NCOs of the compound is caused via water ($H_2O$) included in the moisture of the air, thereby causing bonding of the compounds.

This bonding also enables a polymerization (curing reaction) to proceed. Thus, the curable compound of this embodiment can be sufficiently cured by light or moisture. The surface tackiness of the cured product thus being cured is suppressed, and the cured product can have an appropriate stretchability. When the curable compound of this embodiment includes both of the (meth) acryloyl group and the isocyanate group (—NCO) in the molecule, the curable compound of this embodiment can be sufficiently cured by either light or moisture.

In the general formula (I), X is a branched polyolefin structure having a carbon-carbon double bond in a side chain. The polyolefin structure is preferably a polyolefin structure having a main chain composed of a saturated hydrocarbon (alkylene group) and having a side chain composed of a carbon-carbon double bond. The polyolefin structure preferably has a carbon-carbon double bond at the end of the side chain. Examples of the branched polyolefin include poly butadiene (1,2-poly butadiene, 1,2-polybutadiene including 1,4 addition polymerizable poly butadiene structure) and polyisoprene (1,2-polyisoprene, 3,4-polyisoprene). Some of the side chains in X can be a saturated hydrocarbon. In other words, some of a plurality of side chains can be formed by a saturated hydrocarbon (alkyl group). Of the total number (molar number) of side chains in X, 5% or more (particularly 10% or more, for example) of side chains preferably include a carbon-carbon double bond.

The polyolefin structure in the general formula (I) preferably has a molecular weight of 1000 or more and 6000 or less. Such a molecular weight being 1000 or more can further suppress the mechanical characteristics of the cured product from deteriorating. Such a molecular weight being 6000 or less can further suppress the cured product from being phase-separated and becoming uneven. The molecular weight in the polyolefin structure can be obtained in terms of a standard polystyrene conversion by GPC (gel permeation chromatography) measurement before the curable compound of the general formula (I) is synthesized.

In the general formula (I), two Y's each, independently represent any of a general formula (II) or a general formula (III). In the general formula (I), two Y's can be of the same molecular structure as each other, or can be of different molecular structures from each other.

In the general formula (II) and the general formula (III), T's each represent part of structure of an isocyanurate product, an adduct product, or a biuret product, of an aliphatic diisocyanate having 6 or more and 10 or less total carbon atoms. In other words, T's each correspond to a structure in which-NCO is excluded from the isocyanurate, the adduct, or the biuret as described above. For example, the structure represented by the general formula (α) constitutes the isocyanurate structure, the structure represented by the general formula (b) constitutes the adduct structure, and the structure represented by the general formula (c) or (d) constitutes the biuret structure. In the curable compound represented by the general formula (I), a plurality of T's can be the same as each other, or can be different from each other. The expression "Z or NHCOO—" in the parenthesis in the general formulae (a) to (d) is not included in T in the general formula (II) or (III).

The aliphatic diisocyanate having 6 or more and 10 or less total carbon atoms before forming the isocyanurate structure, the adduct structure, or the biuret structure has an isocyanate group at each of both ends of a linear alkylene group having 4 or more and 8 or less carbon atoms. T in Y is structured with, for example, the isocyanate structure, the adduct structure, or the biuret structure, of the aliphatic diisocyanate, and thus includes neither a benzene ring structure nor a saturated cycloalkyl structure (i.e., a saturated structure having a ring composed only of carbon atoms). T is structured with the isocyanurate structure, the adduct structure, or the biuret structure, of the aliphatic diisocyanate, and thus Y does not include the benzene ring structure. Y without having the benzene ring structure allows the cured product after being cured to have good weather resistance.

Examples of the aliphatic diisocyanate having 6 or more and 10 or less total carbon atoms include hexamethylene diisocyanate (HMDI).

The isocyanurate product is a trimer of the aliphatic diisocyanate. For example, the structure of such a trimer from which a terminal-NCO is removed corresponds to the structure represented by the general formula (α).

The adduct product is a reactant between the aliphatic diisocyanate and a triol having 3 or more and 6 or less carbon atoms. For example, the structure of such a reactant excluding a terminal-NCO corresponds to the structure represented by the general formula (b). The triol having 3 or more and 6 or less carbon atoms includes, as elements, only carbon (C), oxygen (O), and hydrogen (H). Examples of the triol having 3 or more and 6 or less carbon atoms include trimethylolpropane ($CH_3$—$CH_2$—C ($CH_2$—$OH)_3$) and glycerin.

The biuret product is a reactant between the aliphatic diisocyanate and water or a tertiary alcohol. For example, the structure of a moiety of such a reactant inside a terminal-NCO corresponds to the structure represented by the general formula (c) or the general formula (d).

When Y is represented by the general formula (III), two L's in the general formula (III) each are, independently from each other, a diol (glycol) residue that can have an ether bond. L's each are preferably a glycol residue having 2 or more and 6 or less carbon atoms. For example, L's each can be a residue of glycol such as ethylene glycol, diethylene glycol, propylene glycol, dipropylene glycol, butylene glycol (such as 1,2 butanediol, 1,3-butanediol, or 1,4-butanediol), pentylene glycol (such as 1,2-pentanediol, or 1,5-pentanediol), or neopentyl glycol. Since L's each are a residue after a urethanization reaction of each hydroxy group (—OH) with —NCO in diol compound, L's each are, for example, a residue of propylene glycol, L is represented by —$C_3H_6$—O—$C_3H_6$—. L's each are preferably a residue of dipropylene glycol or neopentyl glycol in terms of enabling the curable compound to have good solubility and the cured product to have good heat resistance. Two L's in the general formula (III) are independent of each other, and can be the same as each other or can be different from each other. In other words, a plurality of L's included in the curable compound represented by the general formula (I) can be the same as each other or can be different from each other.

A plurality of Z's in the formulae (II) and (III) each are independent of each other and represent a molecular structure represented by the general formula (α) above or-NCO. At least one of the plurality of Z's in the curable compound represented by the formula (I) can be the molecular structure represented by the general formula (α), while at least one thereof can be-NCO. In other words, the curable compound represented by the general formula (I) can have at least one molecular structure represented by the general formula (α) and at least one-NCO. On the other hand, all the plurality of Z's in the curable compound represented by the formula (I) can be the molecular structure represented by the general formula (α) above, or all the plurality of Z can be —NCO.

In the curable compound represented by the general formula (I), the plurality of Z's represented by the general formulae (II) and (III) each are independent from each other, and can be the same as each other or can be different from each other. Since two Y's represented by the general formula (I) each include a plurality of Z's (two Z's or four Z's), the general formula (I) includes 4 or more and 8 or less Z's. The plurality of Z's in the formula (I) including the formulae (II) and (III) each are individually defined.

In the general formulae (a) to (d), $R^{a1}$ to $R^{a3}$, $R^{b1}$ to $R^{b3}$, $R^c$, $R^{d1}$ to $R^{d3}$, and $R^{e1}$ to $R^{e3}$ each are an organic group at least having carbon atoms, $R^{a1}$ to $R^{a3}$, $R^{b1}$ to $R^{b3}$. $R^c$, $R^{d1}$ to $R^{d3}$, and Rel to $R^{e3}$ each can include a urea bond, a biuret bond, or an allophanate bond, $R^{a1}$ to $R^{a3}$, $R^{b1}$ to $R^{b3}$, $R^{d1}$ to $R^{d3}$, and Rel to $R^{e3}$ each are preferably a saturated hydrocarbon having 4 or more and 8 or less carbon atoms, more preferably a linear saturated hydrocarbon having 6 carbon atoms, but each can have heteroatoms (e.g., N, O, S, or P), and each can be a branched structure. Re is preferably a saturated hydrocarbon having 4 or more and 8 or less carbon atoms, and is more preferably a branched saturated hydrocarbon having 6 carbon atoms, but can include heteroatoms (e.g., N, O, S, or P), and can have a linear structure.

In the general formula (α), a saturated hydrocarbon group having 2 or more and 4 or less carbon atoms of Q is preferably linear. In other words, Q is preferably a linear saturated hydrocarbon group having 2 or more and 4 or less carbon atoms. The number of carbon atoms of the saturated hydrocarbon group in Q is preferably 2.

As the molecular structure represented by the general formula (α), the structure represented by a formula (α-1) below is preferable. The molecular structure represented by the formula (α-1) below has an ethylene group with little steric hindrance, and thus has an advantage of increasing the polymerization rate by irradiation with ultraviolet rays or the like. When the number of carbon atoms of Q in the general formula (α) is 1 (that is, a methylene group), the molecular structure thereof tends to be somewhat easily decomposed at the time of curing.

General formula (α-1)

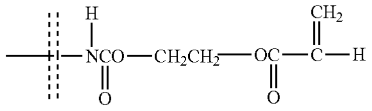

Examples of the curable compound (i.e., compound for curing) represented by the general formula (I) include compounds represented by general formulae (I-A) to (I-G) below:

General formula (I-A)

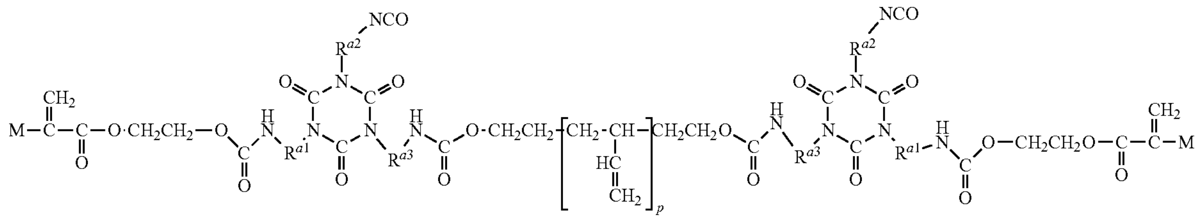

[where $R^{a1}$, $R^{a2}$, and $R^{a3}$ each are independently a linear saturated hydrocarbon having 4 or more and 8 or less carbon atoms, p is 15 or more and 300 or less, and M is H or $CH_3$.]

General formula (I-B)

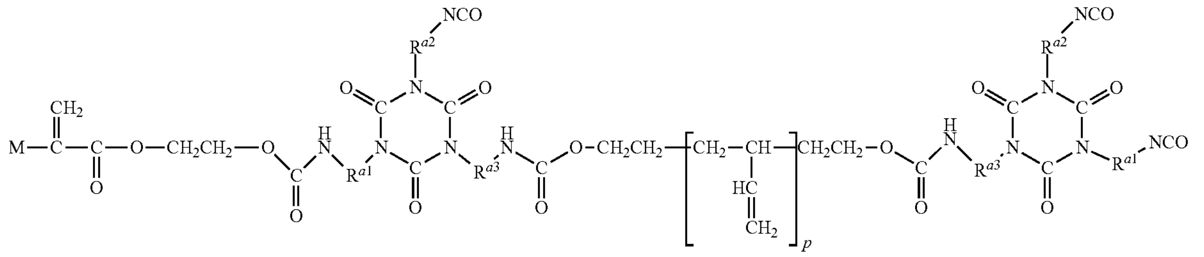

[where $R^{a1}$, $R^{a2}$, and $R^{a3}$ each are independently a linear saturated hydrocarbon having 4 or more and 8 or less carbon atoms, p is 15 or more and 300 or less, and M is H or $CH_3$.]

General formula (I-C)

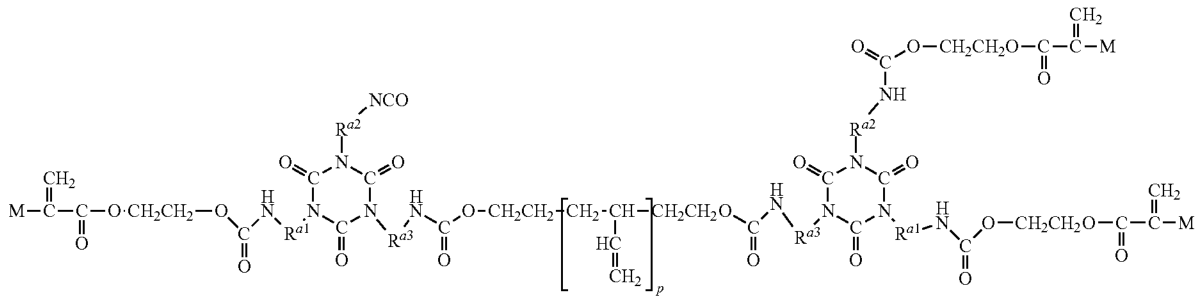

[where $R^{a1}$, $R^{a2}$, and $R^{a3}$ each are independently a linear saturated hydrocarbon having 4 or more and 8 or less carbon atoms, p is 15 or more and 300 or less, and M is H or $CH_3$.]

General formula (I-D)

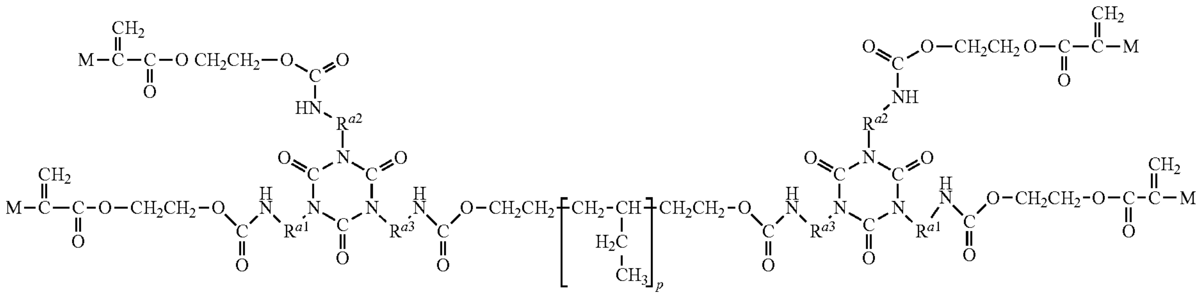

[where $R^{a1}$, $R^{a2}$, and $R^{a3}$ each are independently a linear saturated hydrocarbon having 4 or more and 8 or less carbon atoms, p is 15 or more and 300 or less, and M is H or $CH_3$.]

General formula (I-E)

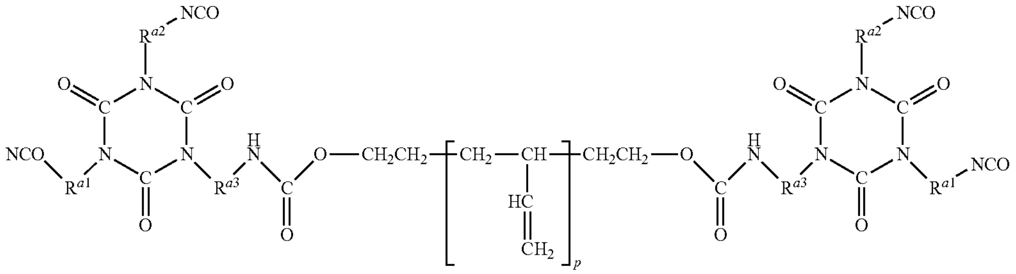

[where $R^{a1}$, $R^{a2}$, and $R^{a3}$ each are independently a linear saturated hydrocarbon having 4 or more and 8 or less carbon atoms, p is 15 or more and 300 or less.]

Gneral formula (I-F)

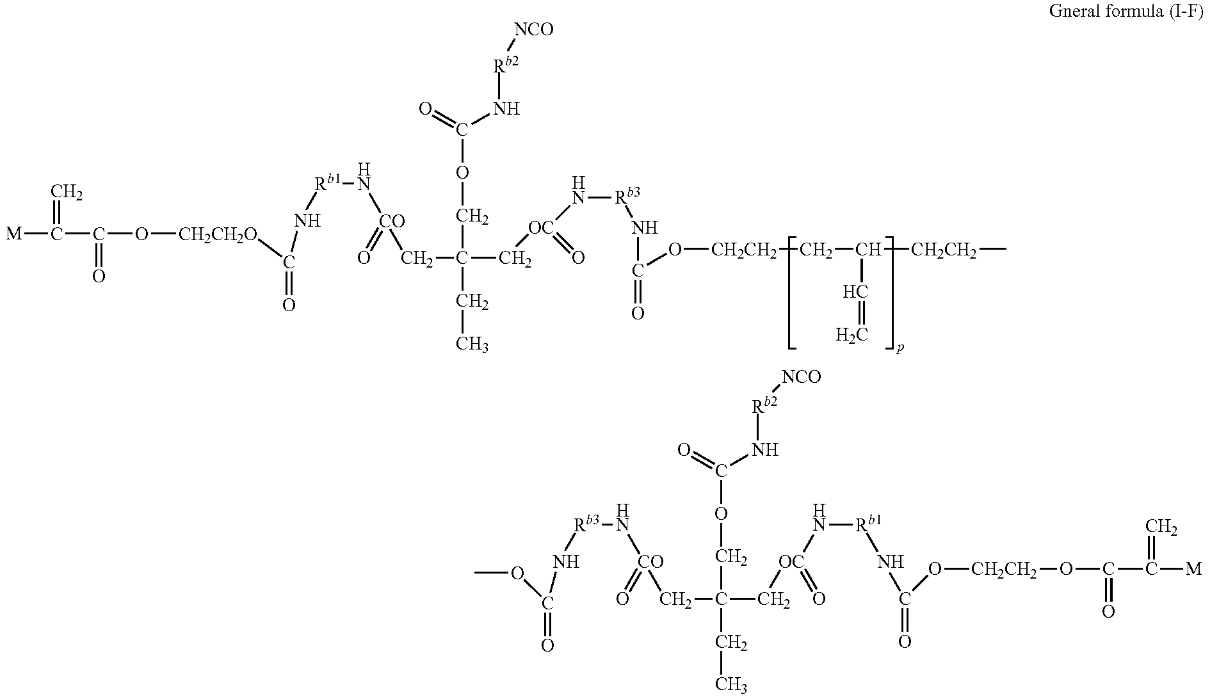

[where $R^{b1}$, $R^{b2}$, and $R^{b3}$ each are independently a linear saturated hydrocarbon having 4 or more and 8 or less carbon atoms, p is 15 or more and 300 or less, and M is H or $CH_3$.]

When Y is represented by the general formula (III), the curable compound of this embodiment is represented by, for example, a general formula (I-G) below.

General formula (I-G)

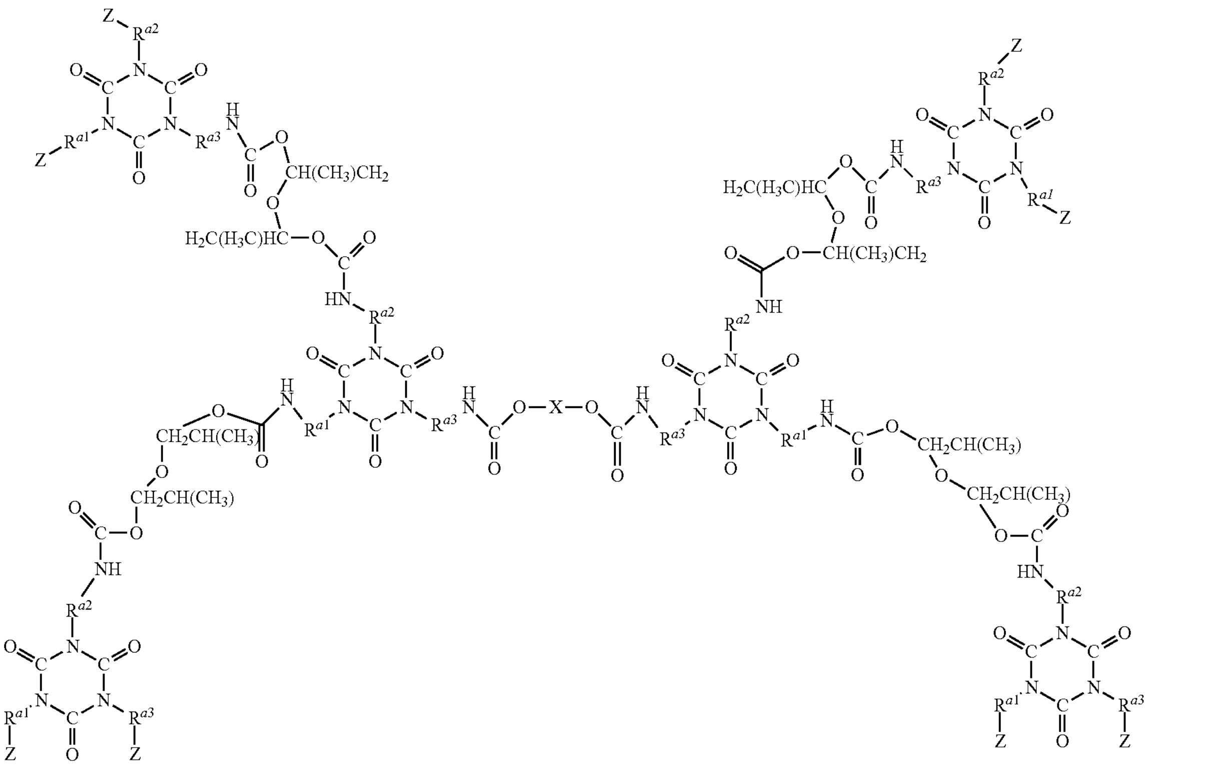

[where $R^{a1}$, $R^{a2}$, and $R^{a3}$ each are independently a linear saturated hydrocarbon having 4 or more and 8 or less carbon atoms, X is described as above, and the plurality of Z's (eight Z's) are described as above.]

(Curable composition)

Next, an embodiment of the curable composition according to the present invention will be described. The curable composition of this embodiment includes the curable compound described above, and thus makes it possible to allow the cured product to have a suppressed surface tackiness and have an appropriate stretchability.

The curable composition of this embodiment includes a urethanization reaction product of: a branched polyolefin diol having a carbon-carbon double bond in a side chain (hereinafter referred to simply as <component A>); at least one selected from the isocyanurate product, the adduct product, and the biuret product, of the aliphatic diisocyanate having 6 or more and 10 or less total carbon atoms (hereinafter referred to simply as <component B>); a hydroxy saturated $C_1$ to $C_4$ alkyl (meth) acrylate (hereinafter referred to simply as <component C>).

The curable composition of this embodiment including the above urethanization reaction product includes at least the curable compound represented by the general formula (I) above. The curable composition of this embodiment includes, in addition to the curable compound represented by the general formula (I) above, another product generated by the urethanization reaction. The curable composition of this embodiment further includes a trace amount of a urethanization reaction catalyst mixed for the urethanization reaction. Note that the urethanization reaction product will be described in detail later.

The curable composition of this embodiment includes at least the curable compound represented by the general formula (I) above and is cured at least by irradiation with light. Further, it may be cured by moisture. The curable composition of this embodiment also includes another product generated by the urethanization reaction, and this other product can also cause a curing reaction by irradiation with light.

<Component A>

The component A is a branched polyolefin diol having a carbon-carbon double bond in a side chain. A polyolefin diol has a molecule having each of both ends provided with a hydroxy group. The olefin moiety has no polar group such as an ether group or an ester group, and is composed only of hydrocarbon. The component A is composed of a main chain and side chains. The main chain can include a saturated hydrocarbon and can include an unsaturated hydrocarbon. The side chain of an olefin moiety includes a carbon-carbon double bond.

Examples of the component A include polybutadienediol (1,2-polybutadienediol, 1,2-polybutadienediol including 1,4 addition polymerizable poly butadiene structure) and polyisoprenediol (1,2-polyisoprenediol, 3,4-polyisoprenediol). As the component A, polybutadienediol (1,2-polybutadienediol) is preferable in terms of being capable of imparting sufficient mechanical flexibility to the cured product (film) after being cured.

The component A has a molecular weight of preferably 1000 or more and 6000 or less.

<Component B>

The component B is polyisocyanate, and is at least one selected from the isocyanurate product, the adduct product, and the biuret product, of the aliphatic diisocyanate having 6 or more and 10 or less total carbon atoms. The component B has three or four isocyanate groups in the molecule. It is preferable that the component B have, in the molecule, neither the benzene ring structure (aromatic ring structure) nor the saturated cycloalkyl structure (saturated structure with a ring composed only of carbon atoms).

The isocyanurate product as the component B is, for example, the trimer of hexamethylene diisocyanate (HMDI) described above, and has three isocyanate groups in the molecule.

The adduct product as the component B is, for example, a reactant of trimethylolpropane and an aliphatic diisocyanate having 6 or more and 10 or less total carbon atoms (such as HMDI described above). Such an adduct product has three isocyanate groups in the molecule.

As the component B, an adduct product in which hexamethylene diisocyanate (HMDI) and trimethylolpropane react with each other, or an isocyanurate product (trimer) of hexamethylene diisocyanate (HMDI) is preferable because it has no benzene ring and thus has good weather resistance after being cured, and because it has good solubility in a diluent when the diluent coexists in the urethanization reaction.

<Component C>

The component C is a $C_1$ to $C_4$ saturated alkyl ester of a (meth) acrylate that has one hydroxy group bonded to any carbon of the saturated hydrocarbon moiety having 1 or more and 4 or less carbon atoms and has one (meth) acryloyl group. The expression "$C_1$ to $C_4$ saturated alkyl" means the number of carbon atoms (1 or more and 4 or less) of the hydrocarbon moiety that has been ester-bonded to (meth) acrylate. The component C is preferably a hydroxy saturated $C_2$ to $C_3$ alkyl (meth) acrylate (in which the saturated hydrocarbon moiety has 2 or more and 3 or less carbon atoms). The expression "(meth) acryl" means to include both of "acryl" and "methacryl".

Examples of the component C include 2-hydroxyethyl (meth)acrylate, 2-hydroxypropyl (meth) acrylate, 3-hydroxypropyl (meth) acrylate, 2-hydroxy butyl (meth)acrylate, and 4-hydroxybutyl (meth) acrylate. In terms of having better polymerizability by irradiation with light, the component C is preferably 2-hydroxyethyl (meth) acrylate, more preferably 2-hydroxyethylacrylate.

The molar ratio (B/A) of the component B to the component A in the urethanization reaction is preferably 2.0 or more, more preferably 4.0 or more. Also, the molar ratio (B/A) is preferably 8.0 or less. The aforementioned molar ratio (B/A) being 2.0 or more has an advantage of allowing the curable compound and the curable composition to have better curability. The aforementioned molar ratio (B/A) being 8.0 or less has an advantage of allowing the curable compound and the curable composition to have better storage stability.

The molar ratio (C/B) of the component C to the component B in the urethanization reaction is preferably 0.2 or more, more preferably 0.4 or more. Also, the molar ratio (C/B) of the component C to the component B in the urethanization reaction is preferably 1.2 or less, more preferably 1.0 or less. The aforementioned molar ratio (C/B) being 0.2 or more has an advantage of further enhancing the photocurability of the curable compound and the curable composition. The aforementioned molar ratio (C/B) being 1.2 or less has an advantage of further enhancing the moisture curability of the curable compound and the curable composition.

The molar ratio (C/A) of the component C to the component A in the urethanization reaction is preferably 2.0 or more. Also, the molar ratio (C/A) of the component C to the component A in the urethanization reaction is preferably 8.0 or less, more preferably 4.0 or less. The aforementioned molar ratio (C/A) being 2.0 or more has an advantage of further enhancing the photocurability of the curable compound and the curable composition. The aforementioned molar ratio (C/A) being 8.0 or less has an advantage of allowing the curable compound and the curable composition to have better storage stability of the curable compound and the curable composition.

The curing reactivity of the curable compound represented by the formula (I) above can be adjusted by changing the molar ratio of each of components mixed for urethanization reaction as described above. Specifically, the curing reactivity (polymerization reactivity) of the curable compound caused by irradiation with light or the like can be enhanced by relatively increasing the mixing amount of the component C. The curable compound that is cured (polymerized) only by irradiation with light or the like can be obtained by, for example, mixing such an amount of the component A and the component C as to cause all the isocyanate groups of the component B to achieve urethanization reaction, while mixing an excessive amount of the component C. Further, the curing reactivity (i.e., reactivity between the isocyanate groups) due to moisture or the like of the curable compound can be enhanced by relatively increasing the mixing amount of the component B. The curable compound that is cured also by moisture or the like can be obtained by, for example, mixing the component B at an amount at which the isocyanate group is excessive to the total amount of the hydroxy groups included in the component A and the component C.

The curable composition of this embodiment is not particularly limited as long as it includes a urethanization reaction product of the component A, the component B, and the component C described above. The curable composition of this embodiment can include, for example, a urethanization reaction product of the component A, the component B, and the component C described above, and additionally, a component D described below. In other words, the urethanization reaction product described above can be obtained by making the component A, the component B, the component C described above react with the component D described below. Further, the curable composition of this embodiment can include a urethanization reaction product obtained by making the component A, the component B, and the component C described above react with a component A' which is similar to the component A. Specifically, the curable composition of this embodiment can include a urethanization reaction product, in which a branched polyolefin diol having a side chain that is composed only by a saturated hydrocarbon is employed as the component A' to thereby cause further reaction with the component A.

<Component D>

The component D is a diol (glycol) having 10 or less carbon atoms and can have an ether bond. The component D is preferably glycol having 2 or more and 6 or less carbon atoms. The component D is preferably, for example, at least one selected from the group consisting of ethylene glycol, diethylene glycol, propylene glycol, dipropylene glycol, butylene glycol (such as 1,2 butanediol, 1,3-butanediol, or 1,4-butanediol), pentylene glycol (such as 1,2-pentanediol, or 1,5-pentanediol), and neopentyl glycol. The component D is preferably at least one of dipropylene glycol and neopentyl glycol because the urethanization reaction product can easily dissolve in alkyl (meth)acrylate monomer (to be described later) and the cured product can have better moisture proof properties and heat resisting properties.

The molar ratio (D/B) of the component D to the component B in the urethanization reaction is preferably 0.3 or more, more preferably 0.5 or more. Also, the molar ratio (D/B) of the component D to the component A in the urethanization reaction is preferably 0.8 or less, more preferably 0.7 or less. The aforementioned molar ratio (D/B) being 0.3 or more has an advantage of allowing the cured product to have better stretchability. The aforementioned molar ratio (D/B) being 0.8 or less has an advantage of allowing the cured compound to have better moisture proof properties and allowing the curable compound and the curable composition to have better storage stability.

Examples of the urethanization reaction product obtained by further reaction with the component D include the curable compound represented by the general formula (I-G) and a reaction product schematically represented as shown in FIG. 1. FIG. 1 schematically shows an example of the reaction product (curable compound) when Y in the general formula (I) is represented by the general formula (III).

Examples of the urethanization reaction product include a compound represented by the general formula (I) above, such as the compounds represented by the general formulae (I-A) to (I-G) above.

In another aspect, examples of the urethanization reaction product include a compound having only an isocyanate group as a reactive group, and a compound having only a (meth) acryloyl group as a reactive group. Further, examples of the urethanazation reaction product include a compound that is a urethanization reaction product between the component A and the component B and has no component C introduced into the molecule, and a compound that is a urethanization reaction product between the component B and the component C and has no component A introduced into the molecule.

The curable composition of this embodiment can further include a compound that does not undergo a urethanization reaction. Such a compound can be a photopolymerizable monomer (to be described later) that produces a polymerization reaction product by irradiation with light. Examples of such a photopolymerizable monomer include a saturated cycloalkyl (meth)acrylate monomer having a saturated cyclic hydrocarbon structure and a (meth) acryloyl group in the molecule, or a saturated chain alkyl (meth)acrylate monomer having a saturated chain hydrocarbon structure and a (meth) acryloyl group in the molecule. Such a compound can be mixed as a diluent before the urethanization reaction to reduce the viscosity in the urethanization reaction system, and can be mixed (to be described later) after the urethanization reaction to impart desired physical characteristics to a cured product after being cured.

The curable composition of this embodiment can include an unreacted component A, an unreacted component B, and an unreacted component C, which have not undergone a urethanization reaction. The curable composition of this embodiment can include the urethanization reaction catalyst mixed for accelerating a urethanization reaction. As described above, the curable composition of this embodiment includes various reaction products and unreacted products. Therefore, it would not be practical to specify the molecular structures of all the compounds included in the curable composition. In other words, it would be rather impractical to directly specify the structures or characteristics of all the compounds included in the curable composition of this embodiment. However, since the molecular structures of the compounds before the urethanization reaction are specified and the product resulting from the urethanization reaction can be fully expected, it is highly possible to expect the molecular structures of the reaction products.

The curable composition of this embodiment may include a photopolymerizable monomer, an isocyanate monomer, a photopolymerization initiator, and the like, which are further added after the urethanization reaction. It is preferable that the curable composition of this embodiment include no compound having a benzene ring (an aromatic hydrocarbon composed of six cyclic carbon atoms) in the molecule, as the urethanization reaction product (curable compound), a photopolymerizable monomer, or an isocyanate monomer.

Examples of the photopolymerizable monomer include a monofunctional photopolymerizable monomer. Examples of the monofunctional photopolymerizable monomer include an alkyl (meth)acrylate monomer having a hydrocarbon group (i.e., alkyl group) having 18 or less carbon atoms. Specifically, examples of the monofunctional photopolymerizable monomer include a saturated cycloalkyl (meth) acrylate monomer having a saturated cyclic hydrocarbon structure and one (meth) acryloyl group in the molecule, or a saturated chain alkyl (meth) acrylate monomer having a saturated chain hydrocarbon structure and one (meth) acryloyl group in the molecule.

Specifically, the curable composition of this embodiment can include at least one of the saturated cycloalkyl (meth) acrylate monomer and the saturated chain alkyl (meth) acry late monomer, as the photopolymerizable monomer that does not undergo a urethanization reaction. Each of these (meth) acry late monomers is a compound that produces a photopolymerization reaction product by irradiation with light.

The saturated cycloalkyl (meth)acrylate monomer is preferably a saturated alicyclic monomer having 8 or more and 15 or less carbon atoms in the molecule. It is preferable that the saturated cycloalkyl (meth)acrylate monomer have none of benzene rings, ether bonds ($—CH_2—O—CH_2—$), and polar groups such as an-OH group and a —COOH group. In the saturated cycloalkyl (meth)acrylate monomer, the saturated cycloalkyl structure can be a saturated hydrocarbon structure including no heteroatoms and composed of 4 or more and 8 or less carbon atoms. The saturated cycloalkyl (meth) acrylate monomer can be monocyclic, bicyclic, or polycyclic. A bicyclic or polycyclic saturated cycloalkyl structure can share two or more carbon atoms. In the bicyclic or polycyclic saturated cycloalkyl (meth) acry late monomer, any cyclic structures can be employed as long as at least one cyclic structure has a saturated alkyl structure, and for example, all the cyclic structures can have a saturated alkyl structure. In the saturated cycloalkyl (meth) acry late monomer, a methyl group or an ethyl group can be further bonded to the carbon of the saturated cyclic hydrocarbon structure.

Specifically, examples of the saturated cycloalkyl (meth) acry late monomer include isobornyl (meth) acrylate (having a norbornane structure), dicyclopentadiene oxyethyl (meth) acrylate (having a norbornane structure), dicyclopentanyl (meth) acrylate (having a norbornane structure), dicyclopentenyl oxyethyl (meth) acry late (having a norbornane structure), and adamantyl (meth) acrylate. Among them, a saturated cycloalkyl (meth)acrylate monomer having a norbornane structure is preferable. The curable composition including the saturated cycloalkyl (meth)acrylate monomer enables the cured product after being cured to increase its moisture resistance.

The saturated chain alkyl (meth)acrylate monomer is preferably a (meth) acrylate monomer having, in the molecule, a saturated chain hydrocarbon having 8 or more and 15 or less carbon atoms. The saturated chain alkyl (meth) acrylate monomer preferably include neither benzene rings, ether bonds ($—CH_2—O—CH_2—$), nor polar groups such as an-OH group or a —COOH group. In the saturated chain alkyl (meth) acrylate monomer, the saturated chain hydrocarbon structure can be a saturated chain hydrocarbon structure including no atoms other than C and H and composed of 7 or more and 11 or less carbon atoms. The above curable composition including the saturated chain alkyl (meth)acrylate monomer can further increase the flexibility of a cured product produced by curing the curable composition.

In the saturated chain alkyl (meth)acrylate monomer, the saturated chain hydrocarbon structure can be linear, and can be branched. In other words, the saturated chain hydrocarbon structure can be a saturated linear hydrocarbon structure, and can be a saturated branched hydrocarbon structure. Further in other words, the saturated chain alkyl (meth) acrylate monomer can be a saturated linear alkyl (meth) acrylate monomer, and can be a saturated branched alkyl (meth) acrylate monomer. As the saturated chain alkyl (meth)acrylate monomer, the saturated branched alkyl (meth)acrylate monomer is preferable in that the above urethanization reaction product can be more sufficiently dissolved in the curable composition. This makes it possible to obtain a more uniform coating film of a cured product, with no significant influence of, for example, the base material on which the cured product is supported, the thickness of the cured product, and the curing reaction conditions.

The hydrocarbon structure of the saturated linear alkyl (meth) acrylate monomer can be a saturated linear alkyl structure. Specifically, examples of the saturated linear alkyl (meth)acrylate monomer include n-heptyl (meth) acrylate, n-octyl (meth) acrylate, n-nonyl (meth) acrylate, n-decyl (meth) acrylate, tridecyl (meth) acrylate, lauryl (meth) acrylate, and stearyl (meth) acrylate.

The hydrocarbon structure of the saturated branched alkyl (meth) acrylate monomer can be a saturated branched alkyl structure, and can be an iso structure, a see structure, a neo structure, or a tert structure. Specifically, examples of the saturated branched alkyl (meth)acrylate monomer include isoheptyl (meth)acrylate, isooctyl (meth) acrylate, isononyl (meth) acrylate, isodecyl (meth) acrylate, and 2-ethylhexyl (meth) acrylate. As the above saturated branched alkyl (meth)acrylate monomer, at least one of isononyl (meth) acrylate and isodecyl (meth) acry late is preferable because they have better solubility with the above urethanization reaction product and make it easier to obtain a more uniform cured coating film.

One of the above monofunctional photopolymerizable monomers can be used alone, or two or more of them can be used in combination. It is preferable that the curable composition of this embodiment include both the saturated cycloalkyl (meth) acrylate monomer and the saturated chain alkyl (meth)acrylate monomer as the photopolymerizable monomer, and it is more preferable that the curable composition of this embodiment include the saturated cycloalkyl (meth)acrylate monomer having a norbornane structure and the saturated branched alkyl (meth)acrylate monomer.

In the curable composition of this embodiment, the mass ratio (n/0) of the saturated cycloalkyl (meth)acrylate monomer (n) to the saturated chain alkyl (meth) acrylate monomer (0) is preferably 1 or more and 8 or less, more preferably 5 or less, still more preferably 3 or less. The above mass ratio (n/0) is preferable when, in particular, the saturated chain alkyl (meth)acrylate monomer is the saturated branched alkyl (meth)acrylate monomer. There is an advantage that the stretchability of the cured product is better when the above mass ratio (n/0) is 1 or more, and the electrical performance (electrical insulation) of the cured product is better when the above mass ratio (n/0) is 8 or less. Thus, there is an advantage that the above mass ratio (n/0) within the above range can obtain the cured product having the electrical insulation performance and the stretch performance with a good balance.

As the photopolymerizable monomer, a monomer having none of benzene rings, ether bonds ($—CH_2—O—CH_2—$), and polar groups such as an-OH group and a —COOH group is preferable in terms of allowing the cured product after being cured to have better weather resistance. The curable composition of this embodiment can include a multifunctional photopolymerizable monomer. Examples of the multifunctional (meth) acrylate monomer include neopentyl glycol di(meth) acrylate, polyethylene glycol di(meth) acrylate, dicyclopentanyl di (meth) acrylate, 1,6-hexanediol di (meth) acry late, polypropylene glycol di(meth) acrylate, ethylene oxide modified bisphenol A di (meth) acrylate, trimethylol propane tri (meth) acrylate, ethylene oxide modified trimethylol propane tri (meth) acrylate, ethylene oxide modified pentaerythritol tetra (meth) acrylate, tris [(meth) acryloxyethyl] isocyanurate, ethylene oxide modified dipentaerythritol hexa (meth) acrylate, and epoxy (meth) acrylate.

Examples of the isocyanate monomer include an aromatic diisocyanate monomer, an alicyclic diisocyanate monomer, and an aliphatic diisocyanate monomer.

These monomers may have 2 or more and 4 or less isocyanate groups in the molecule. Examples of the aromatic diisocyanate monomer include monomers respectively of tolylene diisocyanate, diphenylmethane diisocyanate, diphenylpropane diisocyanate, triphenylmethane diisocyanate, phenylene diisocyanate, xylylene diisocyanate, naphthalene diisocyanate, and tolidine diisocyanate. Examples of the alicyclic diisocyanate monomer include monomers respectively of hydrogenated tolylene diisocyanate, hydrogenated diphenylmethane diisocyanate, hydrogenated xylylene diisocyanate, cyclohexylylene diisocyanate, 3-isocyanatemethyl-3,5,5-trimethylcyclohexylisocyanate (isophorone diisocyanate), 3-isocyanateethyl-3,5,5-trimethylcyclohexylisocyanate, and 3-isocyanateethyl-3,5,5-triethylcyclohexylisocyanate. Examples of the aliphatic diisocyanate monomer include a hexamethylene diisocyanate monomer. The isocyanate monomer may be an adduct product, a biuret product, an isocyanurate product, or a polymeric product of at least one of the above monomers. One of these monomers can be used alone, or two or more of them can be used in combination. As the isocyanate monomer, a monomer including neither a benzene ring nor an unsaturated bond is preferable in terms of allowing the cured product after being cured to have better weather resistance.

The photopolymerization initiator is not particularly limited as long as it is a compound that generates radicals by irradiated light (e.g., ultraviolet rays). Examples of the photopolymerization initiator include an acetophenone-based photoinitiator, a benzoin-based photoinitiator, a benzophenone-based photoinitiator, a thioxanthone-based photoinitiator, and an acylphosphine oxide-based photoinitiator. As the photopolymerization initiator, a commercially available product can be used.

The curable composition of this embodiment can include a photosensitizer, a polymerization inhibitor, an antioxidant, a dye (a fluorescent dye), a pigment, or the like as appropriate.

The curable composition of this embodiment preferably includes 10 mass % or more of the compound represented by the general formula (I). This allows the cured product after being cured to have a further suppressed surface tackiness, while having an appropriate stretchability. The curable compound of this embodiment may include 90 mass % or less of the compound represented by the general formula (I). The curable composition of this embodiment may include 10 mass % or more of a photopolymerizable monomer that does not undergo a urethanization reaction, such as an alkyl (meth)acrylate monomer, and may include 85 mass % or less of the same. The curable composition of this embodiment may include 2 mass % or more of an isocyanate monomer other than the curable compound above, and may include 20 mass % or less of the same.

(Method for producing a curable composition)

Next, an embodiment of a method for producing the curable composition according to the present invention will be described. According to the method for producing the curable composition of this embodiment, the curable composition including the curable compound can be obtained.

In the method for producing the curable composition according to this embodiment, a curable composition including the urethanization reaction product is produced by the urethanization reaction under the presence of: the branched polyolefin diol having a carbon-carbon double bond in a side chain (the component A); at least one selected from the isocyanurate product, the adduct product, and the biuret product, of the aliphatic diisocyanate having 6 or more and 10 or less total carbon atoms (the component B); and the hydroxy saturated $C_1$ to $C_4$ alkyl (meth) acrylate (the component C).

Specifically, the method for producing the curable composition of this embodiment includes a reacting step of synthesizing the urethanization reaction product including the curable compound by the urethanization reaction under the presence of at least the component A, the component B, the component C, and the urethanization reaction catalyst. The method for producing the curable composition of this embodiment further includes an adding step of adding the photopolymerizable monomer, the isocyanate monomer, and the photopolymerization initiator, after the reacting step.

The component A, the component B, the component C, the urethanization reaction catalyst, and the component D that can be added for use, used in the producing method are as described above.

In the producing method, the reacting step is generally performed after the above components are mixed, and then air in a reaction vessel is replaced with nitrogen gas in order to prevent reaction with moisture.

In the reacting step, general reaction conditions suitable for the urethanization reaction can be employed. Preferably, in the reacting step, the urethanization reaction is carried out by maintaining a temperature of 50 to 70° C. for 0.5 to 3 hours.

In the reacting step, the preferable ratios (molar ratios) of the mixing amounts of the component A, the component B, the component C, and the component D that is to be reacted as appropriate, are as described above.

In the reacting step, a compound that is not involved in the urethanization reaction and produces a polymerization reaction product by being irradiated with light may further coexist. Examples of such a compound include the above-mentioned photopolymerizable monomers.

In the adding step, the photopolymerizable monomer, the isocyanate monomer, and the photopolymerization initiator as described above may be further added after the urethanization reaction. The photopolymerizable monomer and the isocyanate monomer to be further added have low viscosity, and thus each serve as a solvent for diluting the curable compound, and also serve to more sufficiently cure the cured product as they themselves are cured by light or moisture. Further including the photopolymerizable monomer and the isocyanate monomer results in a low viscosity of the curable composition for curing, thereby simplifying the step at the time of the application of the curable composition.

In the adding step, a photosensitizer, a polymerization inhibitor, an antioxidant, a dye such as a fluorescent dye, a pigment, and the like may be further included as appropriate.

The curable composition including the curable compound of this embodiment can be used as a cured product cured by, for example, being irradiated with light such as ultraviolet rays. Also, the curable composition including the curable compound of this embodiment can be used by being cured by water (moisture) in the air and thereby being formed into a cured product. Specifically, it is possible that the curable composition is coated on an electronic circuit as a coating object, and then irradiated with light such as ultraviolet rays to be cured, thereby forming a coating film of the cured product. Further, the film can be left to stand in air for several hours to several days to allow a curing reaction to proceed by moisture in the air. It is preferable that the curable composition including the curable compound of this embodiment be cured by both the curing reaction by light and the curing reaction by moisture, but the curable composition can be cured by either one of these curing reactions.

As the light to be irradiated to allow a curing reaction to proceed, ultraviolet rays can be used. Examples of a light source that can be used include a high-pressure mercury lamp, a metal halide lamp, a xenon lamp, a chemical lamp, and an LED lamp. As an irradiation intensity, for example, 10 to 10,000 mW/cm2 can be employed.

It is preferable that the temperature for allowing a curing reaction by moisture to proceed be 20 to 40° C., and the humidity of the air be 40 to 90% RH.

Examples of the object to be coated by applying the curable composition thereto include an electronic circuit or a terminal on a mounting board used for precision devices, an electronic circuit or a terminal on a mounting board mounted on automobiles, bicycles, railway trains, aircraft, ships, and the like, an electronic circuit or a terminal on a mounting board used for mobile devices (e.g., cell phones, digital cameras, digital video cameras), an electronic circuit or a terminal on a board used for outdoor equipment (e.g., water heaters, air conditioner outdoor units), and an electronic circuit or a terminal on a mounting board used for water-use equipment such as laundry machines, electronic bidets, and dishwasher dryers.

The curable compound, the curable composition, and the method for producing the composition, of this embodiment are as exemplified above, but the present invention is not limited to the above exemplified curable compound, curable composition, and method for producing the composition. That is, various forms used in general curable compounds, curable compositions, and methods for producing the compositions can be employed without imparting the effect of the present invention.

The matters discloses herein include the following.

(1-1)

A curable compound represented by the general formula (I) above.

(1-2)

The curable compound described in the above (1-1) in which two Y's in the general formula (I) each independently represent any of a general formula (II) or a general formula (III), and T's in the general formulae (II) and (III) each represent a general formula (α).

(1-3)

The curable compound described in the above (1-1) in which two Y's in the general formula (I) each represent the general formula (III), and T's in the general formula (III) each represent the general formula (α).

(1-4)

The curable compound described in the above (1-1) in which the general formula (I) is at least one selected from the group consisting of the general formulae (I-A), (I-B), (I-C), (I-D), (I-E), (I-F), and (I-G).

(2-1)

A curable composition including a urethanization reaction product of: a branched polyolefin diol having a carbon-carbon double bond in a side chain; at least one selected from an isocyanurate product, an adduct product, and a biuret product, of an aliphatic diisocyanate having 6 or more and 10 or less total carbon atoms; and a hydroxy saturated $C_1$ to $C_4$ alkyl (meth) acrylate.

(2-2)

The curable composition described in the above (2-1) in which the urethanization reaction product further includes a diol compound.

(2-3)

The curable composition described in the above (2-1) or (2-2) including: the urethanization reaction product: a saturated cycloalkyl (meth)acrylate monomer having a saturated cyclic hydrocarbon structure and a (meth) acryloyl group in the molecule; and a saturated chain alkyl (meth)acrylate monomer having a saturated chain hydrocarbon structure and a (meth) acryloyl group.

(2-4)

The curable composition described in the above (2-3) in which a mass ratio of the saturated cycloalkyl (meth)acrylate monomer to the saturated chain alkyl (meth) acrylate monomer is 1 or more and 8 or less.

(2-5)

The curable composition described in any one of the above (2-2) to (2-4) in which the diol compound is glycol (diol) having 2 or more and 6 or less carbon atoms.

(2-6)

The curable composition described in any one of the above (2-3) to (2-5) in which the saturated cycloalkyl (meth)acrylate monomer has a norbornane structure in the molecule, and the saturated chain alkyl (meth)acrylate monomer has a saturated branched alkyl structure in the molecule.

(2-7)

The curable composition described in any one of the above (2-1) to (2-6) including a urethanization reaction product of: a polybutadienediol as the polyolefin diol: the isocyanurate product of an aliphatic diisocyanate having 6 or more and 10 or less total carbon atoms; and hydroxyethyl (meth) acrylate as the hydroxy saturated $C_1$ to $C_4$ alkyl (meth) acrylate.

(3-1)

A method for producing a curable composition including: producing a curable composition including a urethanization reaction product by a urethanization reaction under a presence of: a branched polyolefin diol having a carbon-carbon double bond in a side chain; at least one selected from an isocyanurate product, an adduct product, and a biuret product, of an aliphatic diisocyanate having 6 or more and 10 or less total carbon atoms; and a hydroxy saturated $C_1$ to $C_4$ alkyl (meth) acrylate. (3-2)

A method for producing the curable composition described in the above (3-1), in which the urethanization reaction is carried out under the additional presence of a diol compound.

(3-3)

A method for producing the curable composition described in the above (3-1) or (3-2) including: producing a curable composition including a urethanization reaction product by a urethanization reaction under a presence of: a polybutadienediol as the polyolefin diol: an isocyanurate product of an aliphatic diisocyanate having 6 or more and 10 or less total carbon atoms; and hydroxyethyl (meth) acry late as the hydroxy saturated $C_1$ to $C_4$ alkyl (meth) acrylate.

(3-4)

A method for producing the curable composition described in any one of the above (3-1) to (3-3) including: during or after the urethanization reaction, allowing at least one of: a saturated cycloalkyl (meth)acrylate monomer having a saturated cyclic hydrocarbon structure and a (meth) acryloyl group in the molecule; and a saturated chain alkyl (meth)acrylate monomer having a saturated chain hydrocarbon structure and a (meth) acryloyl group, to further coexist.

EXAMPLES

Next, the present invention will be described in more detail by way of experimental examples, but the present invention is not limited thereto.

As described below, a urethanization reaction was carried out by mixing (A) to (C), and further mixing (D) and (E) as appropriate, to produce a curable composition including the curable compound represented by the general formula (I).

<Raw materials in reacting step>

(Component A)

(A-1) Branched polyolefindiol having a carbon-carbon double bond in a side chain 1,2-polybutadienediol (average molecular weight of 3,000)

Product name "NISSO-PB G-3000" manufactured by Nippon Soda Co., Ltd.: Hydroxyl value (KOHmg/g=29.5)

(A-2) Branched polyolefindiol having a carbon-carbon double bond in each of side chain and main chain 1,2-polybutadienediol having 1,4 addition polymerizable polybutadiene structure (average molecular weight of 2,800)

1,4 addition polymerization/1,2 addition polymerization=8/2 (molar ratio)

Product name "Poly bd R45TH" manufactured by Idemitsu Kosan Co., Ltd.: Hydroxyl value (KOHmg/g=46.6)

(A') Analog of the above (A-1) (having a saturated hydrocarbon group in a side chain)·

Hydrogenated polybutadienediol (average molecular weight of 3,100)

Product name "NISSO-PB GI-3000" manufactured by Nippon Soda Co., Ltd.: Hydroxyl value (KOHmg/g=29.3)

(Component B) Derivative of an aliphatic diisocyanate having 6 or more and 10 or less total carbon atoms Isocyanurate derivative (trifunctional) of hexamethylene diisocyanate (HMDI)

Product name "DURANATE TPA-100: Isocyanate group content of 23%" manufactured by ASAHI KASEI CORPORATION (Component used only in Example 8) Product name "CORONATE HXLV: Isocyanate group content of 23.2%" manufactured by TOSOH CORPORATION (Component C) Hydroxy saturated $C_1$ to $C_4$ alkyl (meth) acrylate 2-hydroxyethyl acrylate (commercially available product)

(Component D) Diol compound

Dipropylene glycol (commercially available product)

(Others)·

Photopolymerizable monomer a (reaction solvent/diluent) (isobornyl acrylate, commercially available product)

Photopolymerizable monomer b (reaction solvent/diluent) (isononyl acrylate, commercially available product)

Urethanization reaction catalyst (dibutyltin dilaurate, commercially available product)

<Raw materials in adding step>

Photopolymerizable monomer a (isobornyl acrylate, commercially available product)

Photopolymerizable monomer b (isononyl acrylate, commercially available product)

Photopolymerizable monomer c (lauryl acrylate, commercially available product)

Photopolymerizable monomer d (isodecyl acrylate, commercially available product)

Photopolymerizable monomer e (trimethylolpropane triacrylate, commercially available product) crosslinkable trifunctional Multifunctional isocyanate a Isocyanurate derivative of hexamethylene diisocyanate (HMDI)

Product name "DURANATE TPA-100" manufactured by ASAHI KASEI CORPORATION

Multifunctional isocyanate b

Isocyanurate derivative of hexamethylene diisocyanate (HMDI)

Product name "CORONATE HXLV" manufactured by TOSOH CORPORATION

Photopolymerization initiator: Product name "IRGACURE 907" manufactured by IGM Resins B. V.

Photosensitizer (2,4-diethylthioxanthone)

Product name "KAYACURE DETX-S" Nippon Kayaku Co., Ltd.

Fluorescent dye: Product name "Tinopal OB" manufactured by BASF Japan Ltd.

Example 1

A urethanization reaction was undergone at 60° C. for one hour under the presence of the above (A) to (D), etc., the reaction solvent, and the reaction catalyst in the mixing amounts shown in Table 1 to perform the reacting step. Next, the above raw materials in the mixing amounts shown in Table 1 were added to the composition after the reacting step and mixed to perform the adding step. Thus, a curable composition including the curable compound represented by the general formula (I) was produced.

Examples 2 to 9, Comparative Examples 1 and 2

Curable compositions were produced in the same manner as in Example 1, except that the mixing amounts were changed to the amounts shown in Table 1 and Table 2. The relative molar ratio of the component (B) was set at 6.0 in the reacting step of each of Examples 3 to 9. However, it was confirmed that gelation occurred during the reaction. Thus, the relative molar ratio in the actual reacting step was set at, for example, 8.0, in order to suppress such gelation.

FT-IR analysis of the reaction products generated in the reacting step of each of Examples 1 to 3 could confirm that the compound represented by the general formula (I) including the general formula (α) was synthesized.

Table 1 and Table 2 show the mixing compositions for producing the curable composition (curable compound) of each Examples. In these Tables, the numerical values in parenthesis indicate the relative molar ratios of molecule of the respective components. Each of the molar ratios was calculated based on the hydroxyl value of the component (A) (or the component (A')). In all the Examples, the component B was mixed in an amount by which the isocyanate groups become excessive relative to the total amount of the hydroxyl groups in the component A and the component C. Thereby, curable compositions cured by being exposed to not only light but also moisture were produced.

TABLE 1

| Relative molar ratio in parenthesis/Unit: mass parts | | | | | | |
|---|---|---|---|---|---|---|
| | | Ex. 1 | Ex. 2 | Ex. 3 | C. Ex. 1 | C. Ex. 2 |
| Reacting step | Component (A-1) | 100 (1.0) | 50.0 (0.5) | 100 (1.0) | — | — |
| | (A') Analog of (A-1) | — | 52.5 (0.5) | — | 100 (1.0) | 100 (1.0) |
| | Component (B) | 28.8 (2.0) | 28.8 (2.0) | 115.2 (8.0) | 28.8 (2.0) | 28.8 (2.0) |
| | Component (C) | 6.11 (2.0) | 6.11 (2.0) | 12.2 (4.0) | 6.11 (2.0) | 6.11 (2.0) |
| | Component (D) | — | — | 14.1 (4.0) | — | — |
| | Urethanization reaction catalyst | 0.00526 | 0.00526 | 0.02489 | 0.00526 | 0.00526 |
| | Photopolymerizable monomer a (reaction solvent) | 134.9 | 134.9 | 106.4 | 134.9 | 134.9 |

TABLE 1-continued

| Relative molar ratio in parenthesis/Unit: mass parts | | | | | | |
|---|---|---|---|---|---|---|
| | | Ex. 1 | Ex. 2 | Ex. 3 | C. Ex. 1 | C. Ex. 2 |
| | Photopolymerizable monomer b (reaction solvent) | — | — | 106.4 | — | — |
| Adding step | Photopolymerizable monomer a | 1.13 | 1.13 | 120.8 | 1.13 | 1.13 |
| | Photopolymerizable monomer b | 58.3 | 58.3 | 45.1 | 58.3 | 58.3 |
| | (Reference) Photopolymerizable monomer e | — | — | — | — | 10 |
| | Polyfunctional isocyanate a | 36.6 | 36.6 | 37.0 | 36.6 | 36.6 |
| | Photopolymerization initiator | 11.0 | 11.0 | 17.8 | 11.0 | 11.0 |
| | Photosensitizer | 1.83 | 1.83 | 2.96 | 1.83 | 1.83 |
| | Fluorescent dye | 0.27 | 0.27 | 0.43 | 0.27 | 0.27 |
| | Total mass | 378.9 | 381.4 | 678.3 | 378.9 | 388.9 |
| | Viscosity of composition before being cured [mPa · s] | 3000 | 2800 | 3100 | 2700 | 2600 |
| | UV irradiance level [mJ/cm$^2$] | 3000 | 3000 | 3000 | 3000 | 3000 |
| Surface tackiness | | Nil | Nil | Nil | Present | Present |
| Stretch rate [%] | | 85 | 85 | 92 | 260 | <10 |
| Volume resistivity [Ω · cm] | | $2.2 \times 10^{15}$ | $4.0 \times 10^{15}$ | $2.2 \times 10^{15}$ | $5.0 \times 10^{15}$ | $3.7 \times 10^{15}$ |

TABLE 2

| Relative molar ratio in parenthesis/Unit: mass parts | | | | | | | |
|---|---|---|---|---|---|---|---|
| | | Ex. 4 | Ex. 5 | Ex. 6 | Ex. 7 | Ex. 8 | Ex. 9 |
| Reacting step | Component (A-1) | — | — | 100 (1.0) | 100 (1.0) | 100 (1.0) | 100 (1.0) |
| | Component (A-2) | 100 (1.0) | 100 (1.0) | — | — | — | — |
| | Component (B) | 175.3 (8.0) | 175.3 (8.0) | 115.2 (8.0) | 115.2 (8.0) | 114.44 (8.0) | 108.03 (7.5) |
| | Component (C) | 18.6 (4.0) | 18.6 (4.0 | 12.2 (4.0) | 12.2 (4.0) | 12.2 (4.0) | 12.2 (4.0) |
| | Component (D) | 21.5 (4.0) | 21.5 (4.0) | 14.1 (4.0) | 14.1 (4.0) | 14.1 (4.0) | 14.1 (4.0) |
| | Urethanization reaction catalyst | 0.03177 | 0.03177 | 0.02489 | 0.02489 | 0.02489 | 0.02489 |
| | Photopolymerizable monomer a (reaction solvent) | 162.9 | 162.9 | 148.9 | 106.37 | 212.37 | 212.74 |
| | Photopolymerizable monomer b (reaction solvent) | 109.0 | 109.0 | — | — | — | — |
| | Photopolymerizable monomer c (reaction solvent) | — | — | 63.8 | — | — | — |
| | Photopolymerizable monomer d (reaction solvent) | — | — | — | 106.37 | — | — |
| Adding step | Photopolymerizable monomer a | 113.0 | 223.4 | 99.2 | 91.4 | 132.52 | 100.11 |
| | Photopolymerizable monomer b | 167.3 | 57.0 | — | — | — | — |
| | Photopolymerizable monomer c | — | — | 101.6 | — | 229.93 | 208.57 |
| | Photopolymerizable monomer d | — | — | — | 91.4 | — | — |
| | Polyfunctional isocyanate a | 47.7 | 47.7 | 40.8 | 38.9 | — | 51.9 |
| | Polyfunctional isocyanate b | — | — | — | — | 50.8 | — |

TABLE 2-continued

| Relative molar ratio in parenthesis/Unit: mass parts | | | | | | |
|---|---|---|---|---|---|---|
| | Ex. 4 | Ex. 5 | Ex. 6 | Ex. 7 | Ex. 8 | Ex. 9 |
| Photopolymerization initiator | 24.7 | 24.7 | 18.8 | 18.3 | 23.6 | 22.0 |
| Photosensitizer | 4.12 | 4.12 | 3.13 | 3.04 | 3.94 | 3.67 |
| Fluorescent dye | 0.54 | 0.54 | 0.43 | 0.43 | 0.45 | 0.43 |
| Total mass | 944.4 | 944.4 | 718.2 | 697.9 | 894.5 | 834.3 |
| Viscosity of composition before being cured [mPa · s] | 2600 | 2290 | 3200 | 2510 | 1980 | 2090 |
| UV irradiance level [mJ/cm$^2$] | 3000 | 3000 | 3000 | 3000 | 3000 | 3000 |
| Surface tackiness | Nil | Nil | Nil | Nil | Nil | Nil |
| Stretch rate [%] | 98 | 117 | 92 | 80 | 94 | 90 |
| Volume resistivity [Ω · cm] | $1.2 \times 10^{15}$ | $2.5 \times 10^{15}$ | $3.2 \times 10^{15}$ | $3.2 \times 10^{15}$ | $3.6 \times 10^{15}$ | $3.7 \times 10^{15}$ |

Each of the curable compositions produced in Examples and Comparative Example was evaluated as described below: Specifically, the surface tackiness, the stretchability; and the volume resistivity of each of the cured products (cured film) produced by curing the curable compositions produced were investigated. In general. the higher volume resistivity, the more sufficiently curing has proceeded.

<Curing treatment>

A tin plate (for evaluation of surface tackiness/measurement of volume resistivity) having a size of 0.3×130×180 mm or a PET film (for measurement of stretchability) having a thickness of 50 μm subjected to release treatment was coated with each of the compositions so that the thickness of the cured product after being cured was 100 μm. Thereafter, samples were irradiated with ultraviolet rays by a 500 W UV lamp so that the integrated light amount reaches 3000 mJ/cm$^2$ light intensity. Further, the samples were left to stand in a constant temperature and humidity apparatus set to 40° C. and 90% RH for 72 hours, and were subjected to a curing treatment by moisture.

<Surface tackiness of cured product (cured film)>

After the cured film was obtained on the tin plate by the above method, a PET film (not subjected to release treatment) having a thickness of 50 μm that has been cut into a 10 mm square was placed on the cured film. Subsequently, at room temperature, the PET film and the tin plate were respectively arranged on the lower side and the upper side, and confirmed whether the PET film fell off within 30 seconds. The PET film that has fallen off was evaluated as having no surface tackiness, while the PET film that has not fallen off was evaluated as having surface tackiness.

<Stretchability of cured product (cured film)>

After the cured film having a thickness of 50 μm was obtained on the PET film by the above method, and was punched out with a Dumbbell-shaped 2 specimen designated in JIS K6251 using a Thomson blade. Then, the cured film was released from the PET film and subjected to a tensile test at room temperature by a method designated in the above JIS standard. The stretchability was calculated in percentage by a calculation formula: stretchability=(increment in length of the cured film when it was broken)/(the original length of the cured film) at tensile speed of 300 mm/min.

<Volume resistivity>

A paste-like silver conductive coating material was applied in a circular shape (with a diameter of 30 mm) to each of the cured products cured as above. The material was allowed to dry at 60° C. for 30 minutes to form an upper electrode. On the other hand, the tin plate arranged on an opposite side of each of the cured products served as a lower electrode. At room temperature, a voltage of DC 100 V was applied, and a resistance value after 60 seconds was obtained. Then, the volume resistivity was obtained by multiplying the area of the electrodes by the resistance value, and then dividing the obtained value by the thickness of the cured product (cured film).

Table 1 and Table 2 show the evaluation results of the cured products after being cured. As can be seen from the evaluation results shown in Table 1 and Table 2, the cured product produced by curing the curable composition of each of Examples had a suppressed surface tackiness, while having an appropriate stretchability as compared with the cured products of Comparative Examples. Note that an appropriate stretchability is, for example, about 30 to 150%. Excessively high stretchability causes the cured product to be fluidized at a high temperature, and thus may lead to a problem of, for example, reducing the soldering resistance. On the other hand, excessively low stretchability may lead to a problem that the cured product is unable to absorb the differential shrinkage with the board under the cooling and heating conditions (repeated high temperature and low temperature conditions) to cause the occurrence of cracking in the cured product.

Comparative Example 2 is an example in which a cured product was obtained by mixing a crosslinkable trifunctional acrylate monomer with the composition. The cured product thus obtained by promoting the crosslinking reaction has a surface tackiness and an excessively low stretchability. Conventionally, in order to reduce the surface tackiness of the cured product, a method has been applied, in which the crosslinking density after being cured is improved by mixing a multifunctional acrylate monomer with a composition before being cured. In accordance with this method, when trimethylolpropane triacrylate was used as the multifunctional acrylate monomer as in Comparative Example 2, it could not be possible to prevent the cured product from not only having an excessively low stretchability (i.e., prevent the cured product from becoming too hard), but also reducing the surface tackiness. In contrast, the cured product produced by curing the composition of each of Examples could achieve both of a suppressed surface tackiness and an appropriate stretchability. The composition of each of Examples includes a curable compound of the above general formula (I) and the curable compound includes the above component (A). Thus, the component (A) is considered to enable the cured product to have flexible physical properties because of its molecular structure. Therefore, it is assumed that even when the surface tackiness of the cured product is reduced by full curing, the cured product have an appropriate stretchability because of the flexible properties of the component (A).

INDUSTRIAL APPLICABILITY

The curable compound and the curable composition of the present invention are, for example, applied to an electronic circuit, then cured by being subjected to light or water (moisture) in the air, and formed into a cured product to be suitably used to coat the electronic circuit with a cured product. The curable composition of the present invention is suitably used, for example, as a curable composition for an insulating coating.

The invention claimed is:

1. A curable compound represented by a general formula (I) below:

General formula (I)

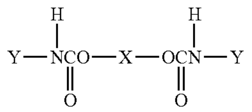

In the general formula (I), X represents a branched polyolefin structure having a carbon-carbon double bond in a side chain, and two Y's represent a general formula (III) below; in the general formula (III), T's each independently represent any of general formulae (a) to (d) below, a plurality of Z's each independently represent any of a molecular structure represented by a general formula (α) below or represent-NCO in the general formula (III), two L's each independently represent a dipropylene glycol residue General formula (III)

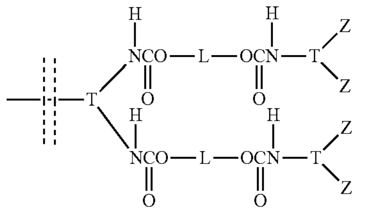

General formula (a)

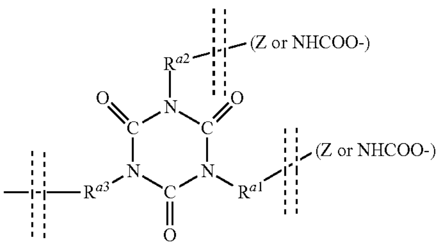

in the general formula (α), $R^{a1}$, $R^{a2}$, and $R^{a3}$ each independently represent an organic group General formula (b)

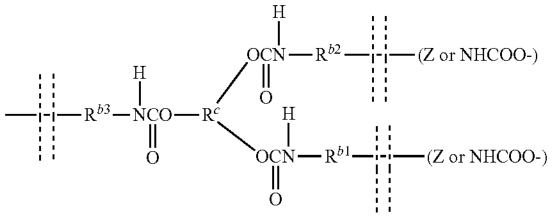

in the general formula (b), $R^{b1}$, $R^{b2}$, $R^{b3}$, and $R^{c}$ each independently represent an organic group General formula (c)

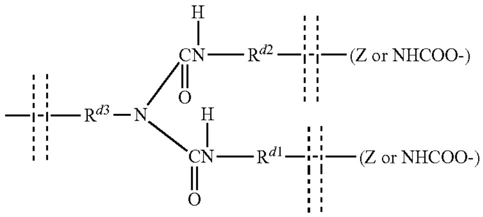

in the general formula (c), $R^{d1}$, $R^{d2}$, and $R^{d3}$ each independently represent an organic group General formula (d)

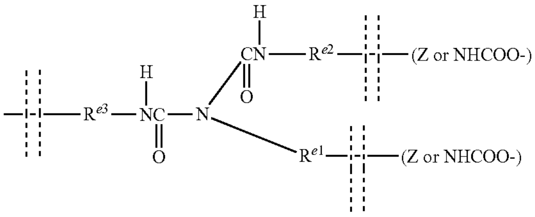

in the general formula (d), $R^{e1}$, $R^{e2}$, and $R^{e3}$ each independently represent an organic group General formula (α)

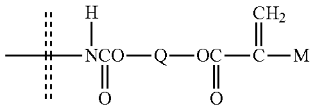

in the general formula (α), Q represents a saturated hydrocarbon group having 2 or more and 4 or less carbon atoms, and M represents H or $CH_3$.

2. A curable composition comprising:

a urethanization reaction product of:

a branched polyolefin diol having a carbon-carbon double bond in a side chain;

at least one selected from an isocyanurate product, an adduct product, and a biuret product, of an aliphatic diisocyanate having 6 or more and 10 or less total carbon atoms;

a hydroxy saturated $C_1$ to $C_4$ alkyl (meth) acrylate; and dipropylene glycol.

3. The curable composition according to claim 2, further comprising:

the urethanization reaction product;

a saturated cycloalkyl (meth)acrylate monomer having a saturated cyclic hydrocarbon structure and a (meth) acryloyl group in the molecule; and a saturated chain alkyl (meth)acrylate monomer having a saturated chain hydrocarbon structure and a (meth) acryloyl group in the molecule.

4. The curable composition according to claim 3, wherein a mass ratio of the saturated cycloalkyl (meth)acrylate monomer to the saturated chain alkyl (meth)acrylate monomer is 1 or more and 8 or less.

5. A method for producing a curable composition, the method comprising:

producing a curable composition comprising a urethanization reaction product by a urethanization reaction under a presence of:

a branched polyolefin diol having a carbon-carbon double bond in a side chain;

at least one selected from an isocyanurate product, an adduct product, and a biuret product, of an aliphatic diisocyanate having 6 or more and 10 or less total carbon atoms;

a hydroxy saturated $C_1$ to $C_4$ alkyl (meth) acrylate; and dipropylene glycol.

6. The curable composition according to claim 3, wherein the saturated chain alkyl (meth)acrylate monomer comprises an isononyl (meth) acrylate.

* * * * *